US012502259B2

(12) United States Patent
Davis

(10) Patent No.: US 12,502,259 B2
(45) Date of Patent: Dec. 23, 2025

(54) DENTAL IMPRESSION TRAY WITH BITE REGISTRATION AND METHOD OF MAKING DENTURES FROM THE SAME

(71) Applicant: Meharry Medical College, Nashville, TN (US)

(72) Inventor: William P. Davis, Nashville, TN (US)

(73) Assignee: Meharry Medical College, Nashville, TN (US)

( * ) Notice: Subject to any disclaimer, the term of this patent is extended or adjusted under 35 U.S.C. 154(b) by 0 days.

(21) Appl. No.: 18/906,753

(22) Filed: Oct. 4, 2024

(65) Prior Publication Data

US 2025/0114172 A1 Apr. 10, 2025

Related U.S. Application Data

(62) Division of application No. 18/480,944, filed on Oct. 4, 2023, now abandoned.

(51) Int. Cl.
*A61C 9/00* (2006.01)
*A61C 19/05* (2006.01)

(52) U.S. Cl.
CPC ............ *A61C 9/0006* (2013.01); *A61C 19/05* (2013.01)

(58) Field of Classification Search
CPC .......... A61C 9/0006; A61C 9/00; A61C 19/05
See application file for complete search history.

(56) References Cited

U.S. PATENT DOCUMENTS 5,266,031 A * 11/1993 Marigza .................. A61C 9/00 433/214
5,502,087 A * 3/1996 Tateosian .............. C08F 279/06 433/199.1
6,196,840 B1 3/2001 Zentz et al.
(Continued)

FOREIGN PATENT DOCUMENTS

FR 2630905 * 5/1988
FR 2 630 905 A1 11/1989
(Continued)

OTHER PUBLICATIONS

International Search Report mailed Feb. 21, 2025 in correspondence PCT Application No. PCT/US24/049942, in 3 pgs.
(Continued)

*Primary Examiner* — Yogesh P Patel
(74) *Attorney, Agent, or Firm* — Bradley Arant Boult Cummings LLP; Phillip E. Walker; Alex H. Huffstutter

(57) ABSTRACT

An impression system is disclosed for enabling the creation of dentures in one-visit. The impression system may include an upper impression tray, an upper wax bite registration coupled to the upper impression tray, a lower impression tray, a lower wax bite registration coupled to the lower impression tray, and one or more arc-shaped wax plates configured to be coupled to at least one of the upper or lower wax bite registrations. Each of the upper and lower impression trays may include a convex outer surface and a concave inner surface with the associated wax bite registration coupled to the convex outer surface. The one or more arc-shaped wax plates may be configured to adjust distance between the concave inner surfaces of the upper and lower impression trays, generally associated with an occlusal vertical dimension of the patient.

18 Claims, 8 Drawing Sheets

100
114
110
120
150,150A
150,150B
150,150C
150,150D
150,150E
140
146
130

(56) References Cited

U.S. PATENT DOCUMENTS

| | | | | |
|---|---|---|---|---|
| 9,962,243 | B1 * | 5/2018 | Lopez | A61C 9/0006 |
| 10,070,946 | B1 | 9/2018 | Alzain | |
| 2012/0179281 | A1 | 7/2012 | Steingart et al. | |
| 2015/0190216 | A1 * | 7/2015 | Suga | A61C 9/0006<br>433/213 |
| 2018/0125617 | A1 | 5/2018 | Morales et al. | |
| 2023/0069231 | A1 * | 3/2023 | Gerth | A61C 13/0019 |
| 2023/0070296 | A1 | 3/2023 | Karaceper et al. | |
| 2024/0033061 | A1 * | 2/2024 | Hultgren | A61C 13/0004 |

FOREIGN PATENT DOCUMENTS

| | | |
|---|---|---|
| KR | 20230112182 | 7/2023 |
| WO | WO2020171314 | 8/2020 |

OTHER PUBLICATIONS

Written Opinion of International Search Report mailed Feb. 21, 2025 in correspondence PCT Application No. PCT/US24/049942, in 4 pgs.

* cited by examiner

DENTAL IMPRESSION TRAY WITH BITE REGISTRATION AND METHOD OF MAKING DENTURES FROM THE SAME

CROSS-REFERENCES TO RELATED APPLICATIONS

This is a divisional patent application claiming priority to co-pending U.S. Non-Provisional patent application Ser. No. 18/480,944 filed Oct. 4, 2023, and entitled "Dental Impression Tray With Bite Registration And Method of Making Dentures From The Same".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to dentures. More particularly, the present disclosure pertains to simplified apparatus and method for fabricating and fitting dentures.

2. Description of the Prior Art

Traditional complete denture protocol requires the patient to experience more than a few visits before complete denture fabrication takes place. These visits may include preliminary impression making, final impression making, vertical with centric record taking, and denture base and tooth selection visits to assure the appropriate esthetics, phonetics and function of the complete denture prosthetic.

Conventional impressioning techniques utilize one or more elastomeric materials with low viscosity and flowability, such as alginate, hydrocolloid, polyvinylsiloxane, polyether, or polysulfide. These materials are typically dispensed onto both the dental area being replicated and an arch-shaped tray, which is coated with adhesive and has a somewhat rigid structure. Following this, the elastomeric material, along with the tray, is gently pressed against the dental tissue and maintained in position until the elastomeric substance solidifies.

Conventional impressioning techniques do not disclose a custom fitting variable dimension bite registration dental impression tray, comprising: a bite registration member, and a heat adjustable variable dimension dental impression tray.

The challenges posed by earlier methods have been successfully addressed through this novel invention. The innovation offers a customized tray that can be adjusted to match a patient's unique dental tissue dimensions, enabling the creation of a final impression and the capture of an occlusal record (bite registration) within a single patient visit to the dental office. Furthermore, the wax rims are skillfully shaped to replicate the anticipated position of the denture teeth.

BRIEF SUMMARY

In view of at least some of the above-referenced problems in conventional dental impression implementations, an exemplary object of the present disclosure may be to provide an improved impression apparatus, system, and method for producing complete dentures in a reduced timeframe, thereby reducing the amount a visits a patient must experience.

An exemplary such impression system may desirably feature upper and lower thermoplastic impression trays, each with its own wax bite registration coupled thereto.

A technique for utilization of the impression system may establish the vertical relationship after the thermoplastic component is heated and adapted to the anatomical intraoral landmarks that are dictated by the border movements initiated by the patient's activation of the muscles of mastication and the muscles of facial expression. For example, a kissing motion may be practiced prior to this preliminary impression phase of the tray adaption. A polyvinyl siloxane wash ensures the accuracy of the intaglio of the tray. The vertical relations may be either increased or decreased by adding or reducing the wax component of the tray.

In various embodiments, an impression system as disclosed herein may preferably be configured for performance of a "One Visit" denture protocol that provides a convenient method for success with complete dentures. Advantageously, the "One Visit" technique the capture of all necessary records during the initial visit increasing denture production predictability of accuracy while also providing patients with fewer and shorter chair time appointments. For example, the operator may be able to make accurate impressions and take vertical dimension during a single encounter.

The impression system may provide patients with improved denture outcomes with a reduction in time expenditure for patients as well as operators.

In a particular embodiment, an exemplary apparatus for fabricating dentures as disclosed herein may include an impression tray, a wax bite registration, and one or more arc-shaped wax plates. The impression tray may have a convex outer surface and a concave inner surface. The wax bite registration may be coupled to the convex outer surface of the impression tray. The one or more arc-shaped wax plates may be configured to be coupled to the wax bite registration.

In another embodiment, an exemplary system for fabricating dentures as disclosed herein may include an upper impression tray, an upper wax bite registration, a lower impression tray, and a lower wax bite registration. The upper impression tray may have a convex outer surface and a concave inner surface. The upper wax bite registration may be coupled to the convex outer surface of the upper impression tray. The lower impression tray may have a convex outer surface and a concave inner surface. The lower wax bite registration may be coupled to the convex outer surface of the lower impression tray.

In another embodiment, an exemplary method of using an impression system for fabricating dentures as disclosed herein may include (a) heating one or more of the upper impression tray or the lower impression tray in a water bath vessel; (b) inserting the upper impression tray and the lower impression tray into a mouth of the patient with the upper wax bite registration facing the lower wax bite registration; and (c) confirming an occlusal vertical dimension (OVD) by either adding one or more arc-shaped wax plates to one or more of the upper wax bite registration or the lower wax bite registration, or reducing a height of one or more of the upper wax bite registration or the lower wax bite registration.

In another embodiment, an exemplary kit for fabricating dentures as disclosed herein may include an upper impression tray having a convex outer surface and a concave inner surface; an upper wax bite registration coupled to the convex outer surface of the upper impression tray; a lower impression tray having a convex outer surface and a concave inner surface; a lower wax bite registration coupled to the convex outer surface of the lower impression tray; and one or more arc-shaped wax plates configured to be coupled to at least one of the upper or lower wax bite registration

DETAILED DESCRIPTION

Figure 1:
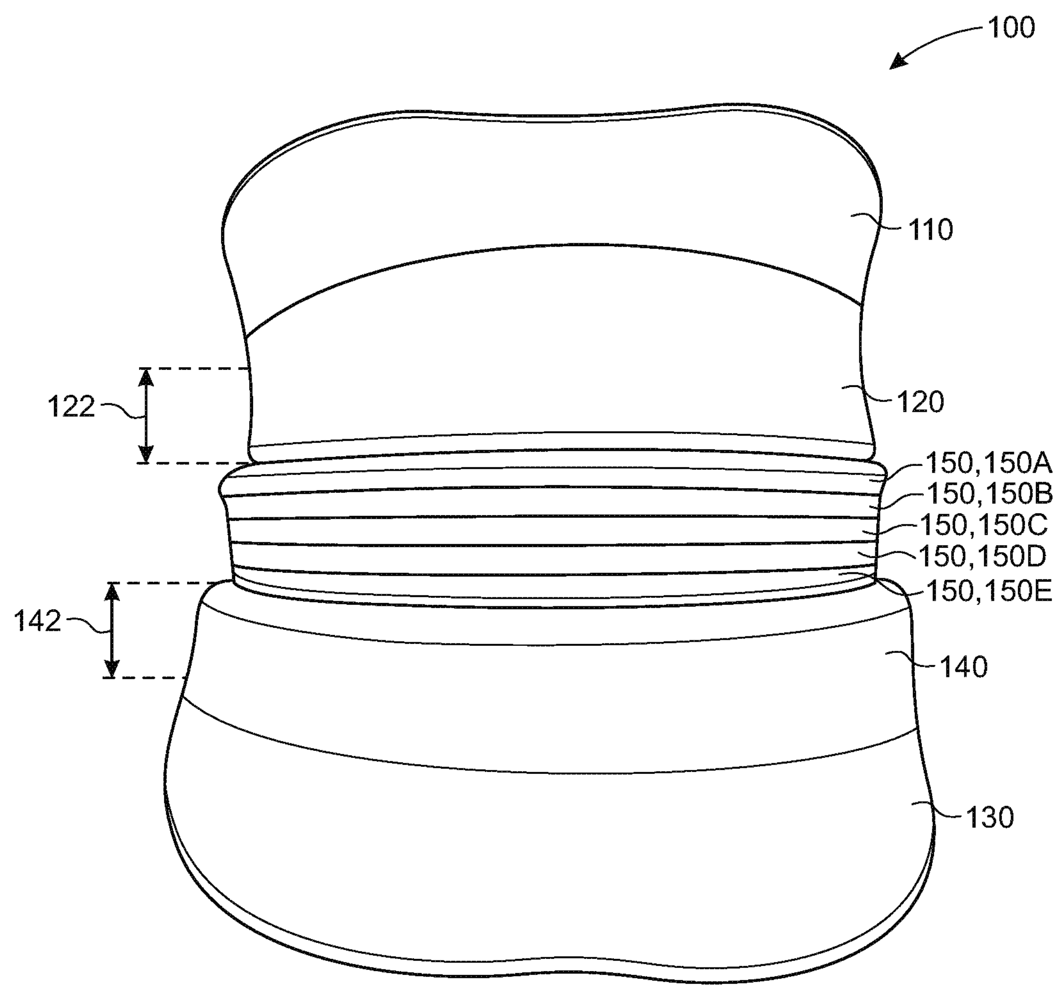
FIG. 1 is a front elevation view of an embodiment of an impression system for fabricating dentures in accordance with the present disclosure.
Figure 2:
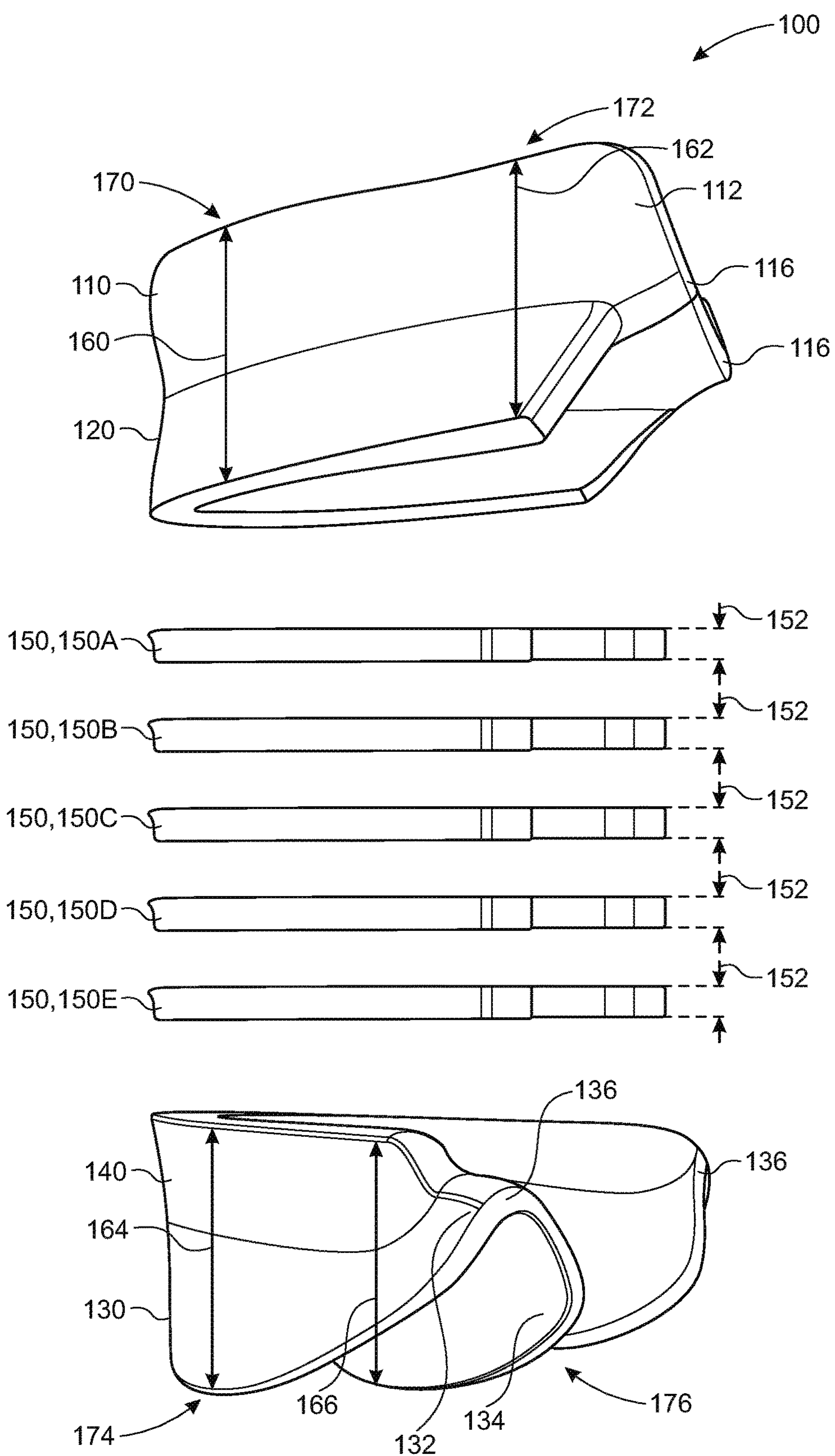
FIG. 2 is an exploded perspective view of the impression system of FIG. 1 in accordance with the present disclosure.
Figure 3:
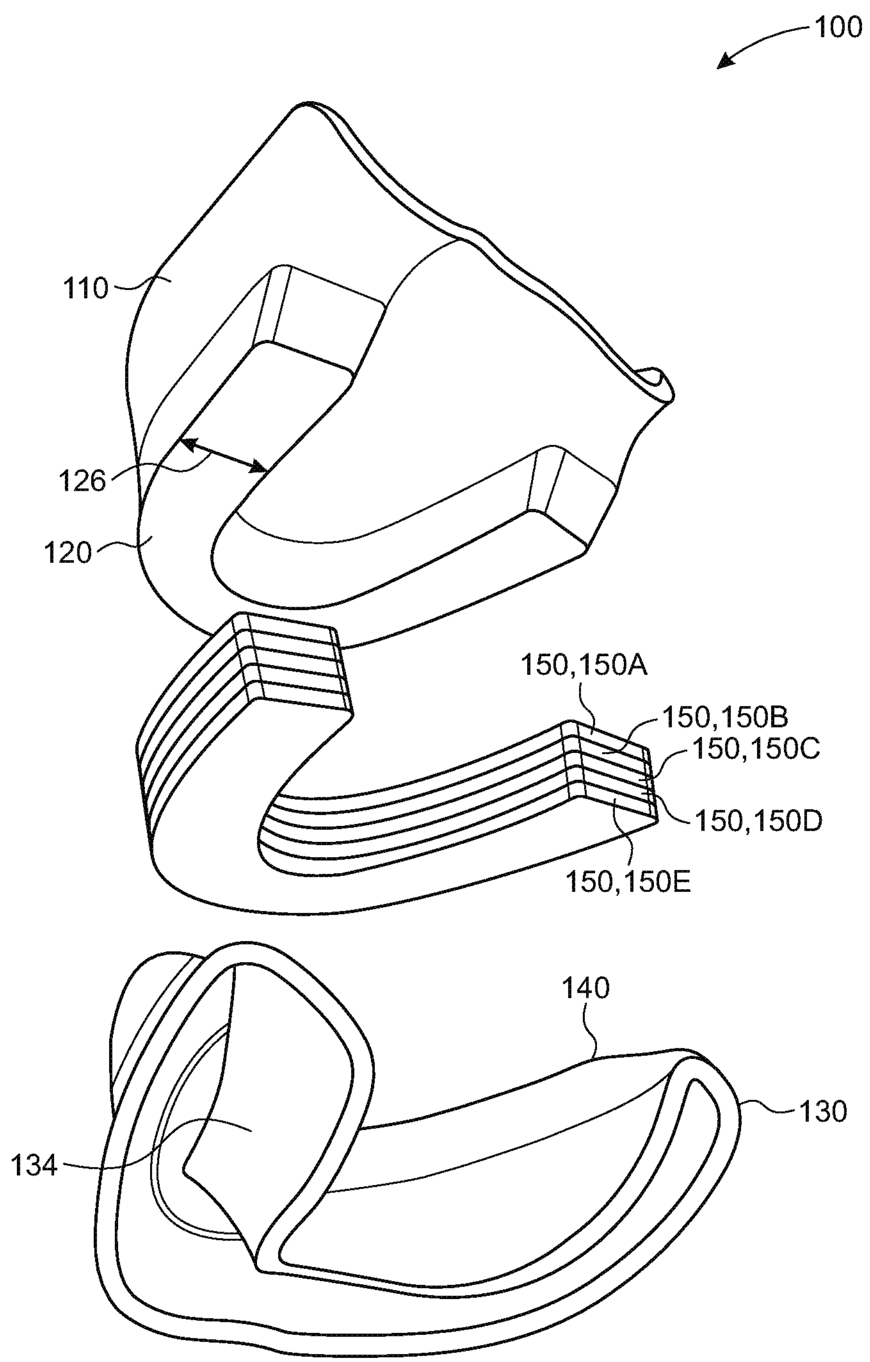
FIG. 3 is a partially exploded lower-rear-right perspective view of the impression system of FIG. 1 in accordance with the present disclosure.
Figure 4:
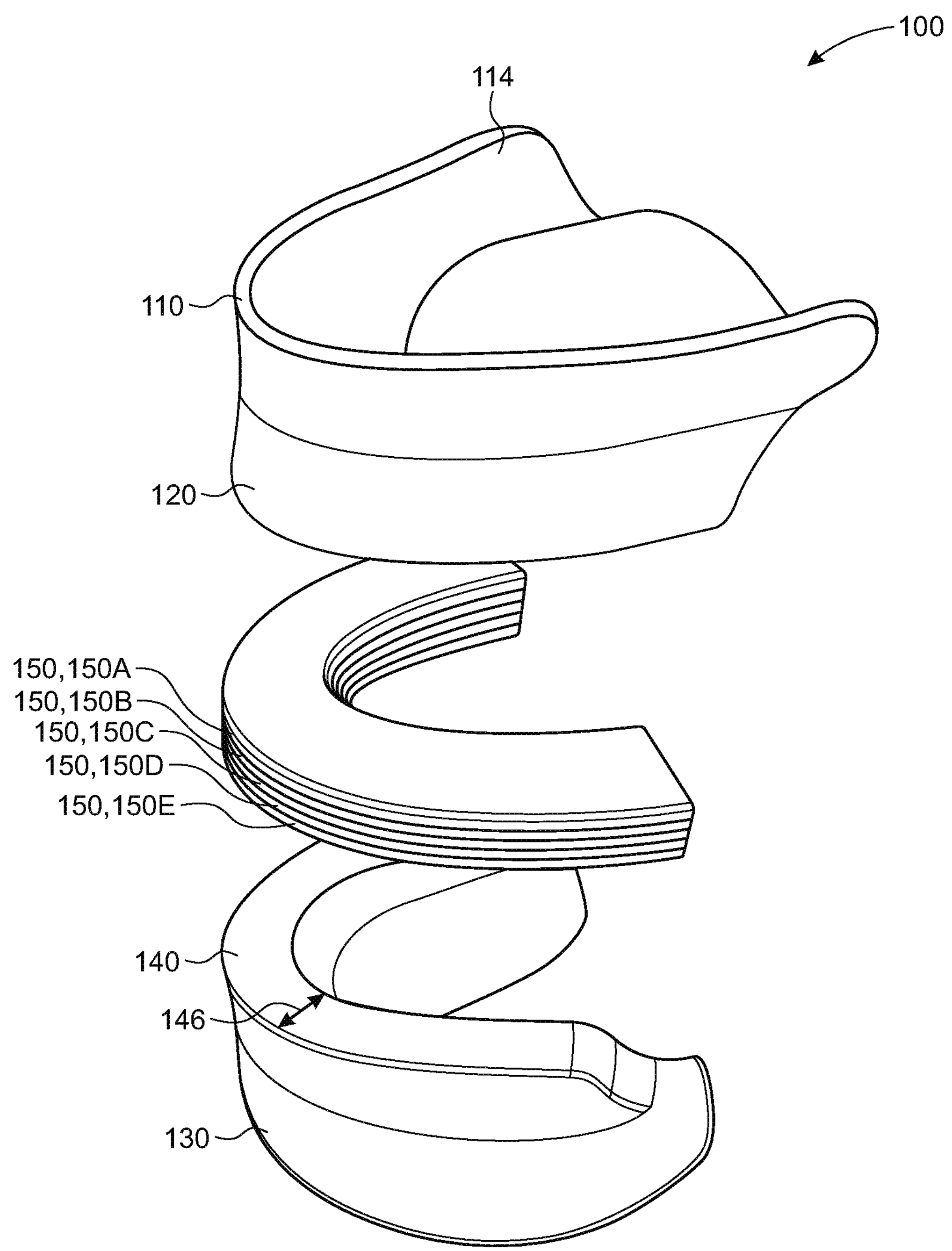
FIG. 4 is a partially exploded upper-front-right perspective view of the impression system of FIG. 1 in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-4, a system 100 for fabricating dentures is shown. The system 100 may also be referred to herein as an impression system 100 or a kit 100. The system 100 may include an upper impression tray 110, an upper wax bite registration 120, a lower impression tray 130, and a lower wax bite registration 140. In some embodiments, the system 100 may include one or more arc-shaped wax plates 150. An apparatus for fabricating dentures may include one of the upper or lower impression trays 110, 130, a corresponding one of the upper or lower wax bite registrations, and optionally the one or more arc-shaped wax plates 150. Each of the upper and lower impression trays 110, 130 may come in different sizes (e.g., small, medium, or large), with a size of the upper and lower wax bite registrations 120, 140 as well as that of the one or more arc-shaped wax plates 150 corresponding to said size of the upper and lower impression trays 110, 130.

Figure 5:
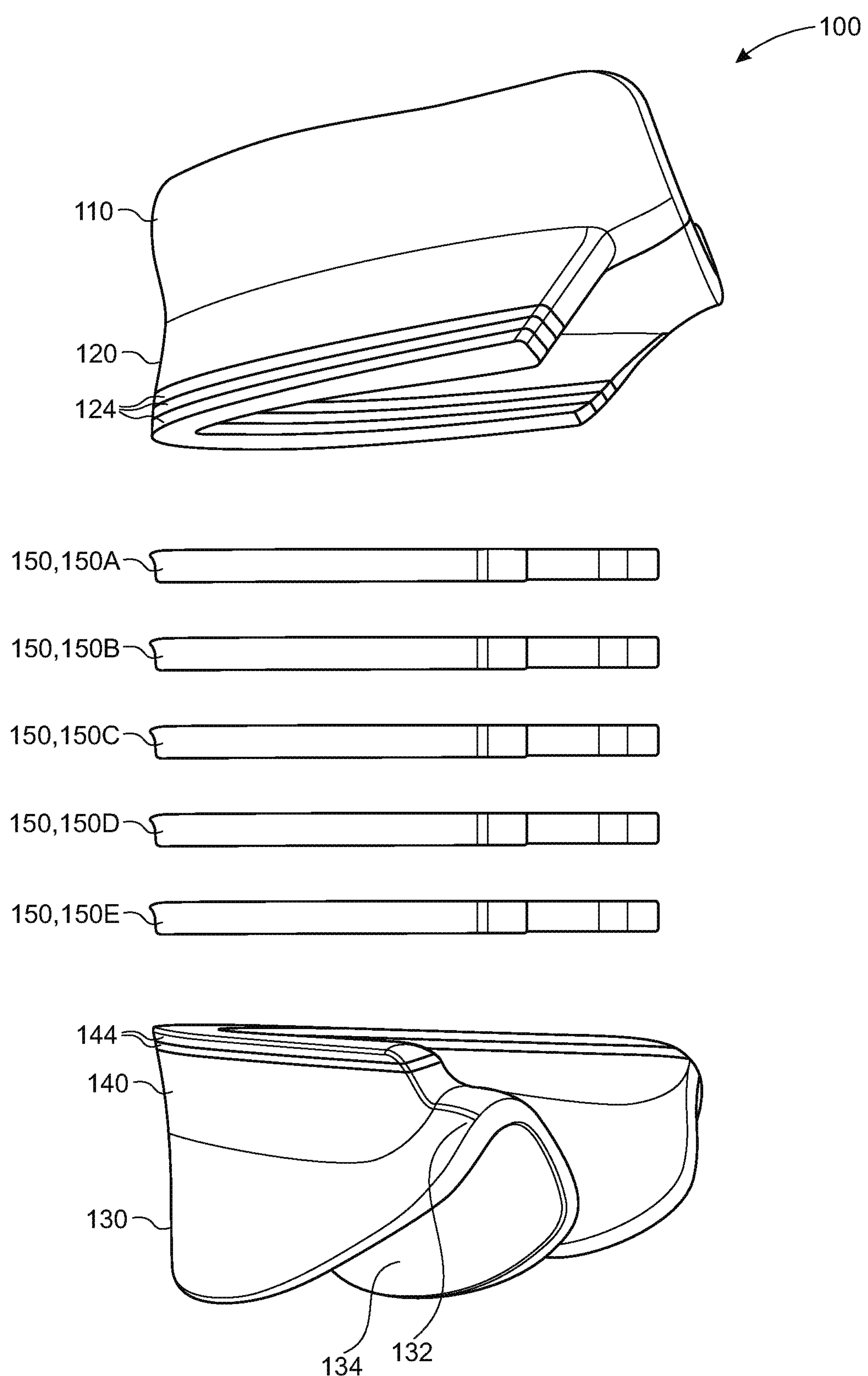
FIG. 5 is an exploded perspective view of an embodiment of an impression system in accordance with the present disclosure.

The upper impression tray 110 may have a convex outer surface 112 and a concave inner surface 114. The upper wax bite registration 120 may be coupled to the convex outer surface 112 of the upper impression tray 110. In certain optional embodiments, as illustrated in FIG. 5, the upper wax bite registration 120 may comprise a plurality of layers 124. One or more of the plurality of layers 124 may be removed in order to reduce a height 122 of the upper wax bite registration 120. In other optional embodiments, the upper wax bite registration 120 may be a single solid layer. The height 122 of the upper wax bite registration 120 may be reduced by removing a portion of the upper wax bite registration 120.

The lower impression tray 130 may have a convex outer surface 132 and a concave inner surface 134. The lower wax bite registration 140 may be coupled to the convex outer surface 132 of the lower impression tray 130. In certain optional embodiments, as illustrated in FIG. 5, the lower wax bite registration 140 may comprise a plurality of layers 144. One or more of the plurality of layers 144 may be removed in order to reduce a height 142 of the lower wax bite registration 140. In other optional embodiments, the lower wax bite registration 140 may be a single solid layer. The height 142 of the lower wax bite registration 140 may be reduced by removing a portion of the lower wax bite registration 140.

In some embodiments, the upper wax bite registration 120 extends to within 5 mm from a rear edge 116 of the upper impression tray 110. In some embodiments, the lower wax bite registration 140 extends to within 5 mm of a rear edge 136 of the lower impression tray 130. In some embodiments, a combined height 160 of an upper front portion 170 of the upper impression tray 110 and the upper wax bite registration 120 may be less than about 22 mm. In some embodiments, a combined height 162 of an upper rear portion 172 of the upper impression tray 110 and the upper wax bite registration 120 may be less than about 18 mm. In some embodiments, a combined height 164 of a lower front portion 174 of the lower impression tray 130 and the lower wax bite registration 140 may be less than about 18 mm. In some embodiments, a combined height 166 of a lower rear portion 176 of the lower impression tray 130 and the lower wax bite registration 140 may be less than about 22 mm. In some embodiments, each of the upper wax bite registration 120 and the lower wax bite registration 140 may include a width 126, 146, respectively, of between about 6 mm and about 8 mm.

The concave inner surface 114, 134 of each of the upper and lower impression trays 110, 130, respectively, may be configured to receive an impression material, such as, for example, polyvinyl siloxane (PVS), polyether, zinc oxide eugenol (ZOE), alginate, silicone rubber, hydrocolloids, composite resin, or any other functional impression material.

The one or more arc-shaped wax plates 150 may be configured to be coupled to at least one of the upper wax bite registration 120 or the lower wax bite registration 140. As illustrated in FIGS. 1-4, the one or more arc-shaped wax plates 150 may include a first arc-shaped wax plate 150A, a second arc-shaped wax plate 150B, a third arc-shaped wax plate 150C, a fourth arc-shaped wax plate 150D, and a fifth arc-shaped wax plate 150E. Each of the one or more arc-shaped wax plates 150 may include a thickness 152. The thickness 152 may also be referred to herein as a height 152. The thickness 152 may be about 1 mm. In some embodiments, the thickness 152 may be greater than about 1 mm. In some embodiments, the thickness 152 may be less than about 1 mm. In some embodiments, the thickness 152 may be less than about 0.9 mm. In some embodiments, the thickness 152 may be less than about 0.8 mm. In some embodiments, the thickness 152 may be less than about 0.7 mm. In some embodiments, the thickness 152 may be less than about 0.6 mm. In some embodiments, the thickness 152 may be less than about 0.5 mm.

Figure 6:
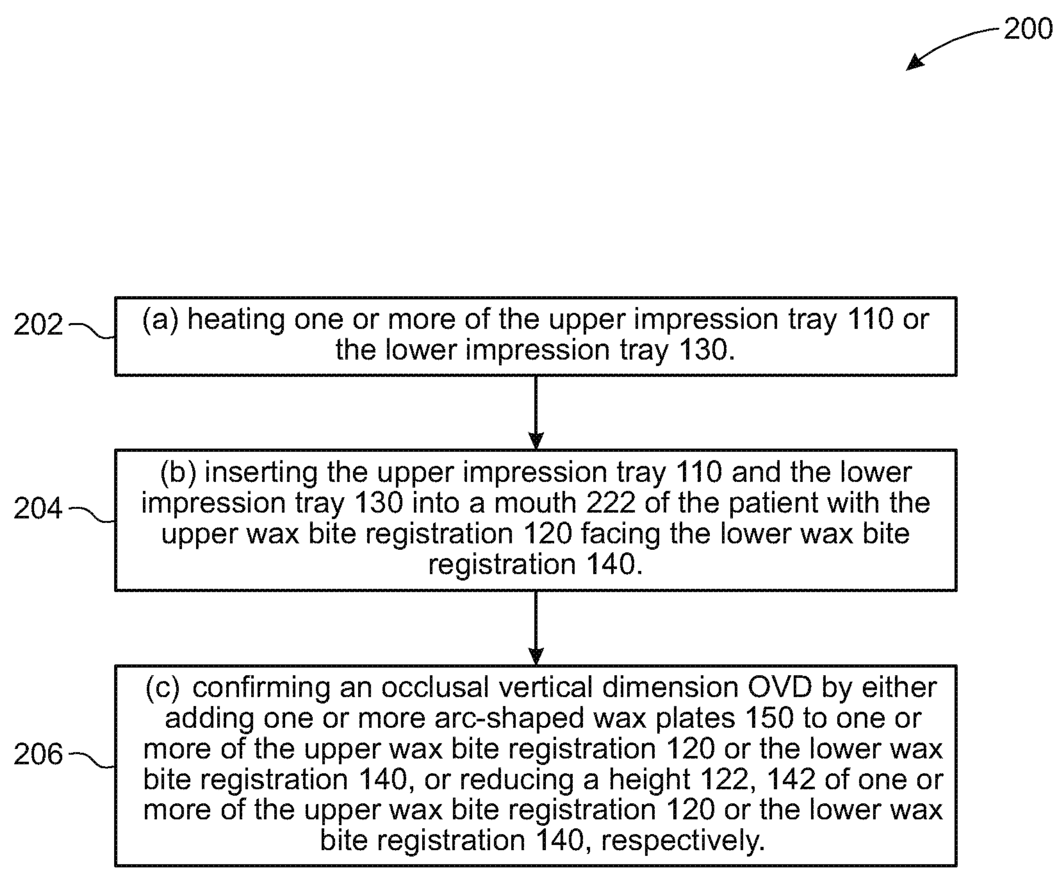
FIG. 6 is a flowchart of an embodiment of a method of using the impression system of FIG. 1 in accordance with the present disclosure.
Figure 8:
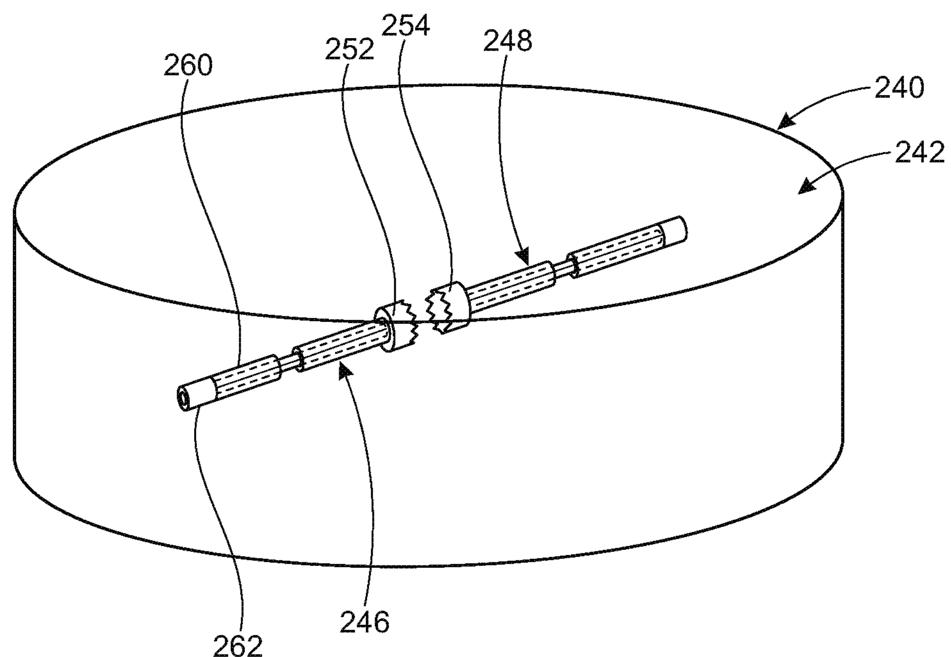
FIG. 8 is a perspective view of an embodiment of a water bath vessel in accordance with the present disclosure.
Figure 9:
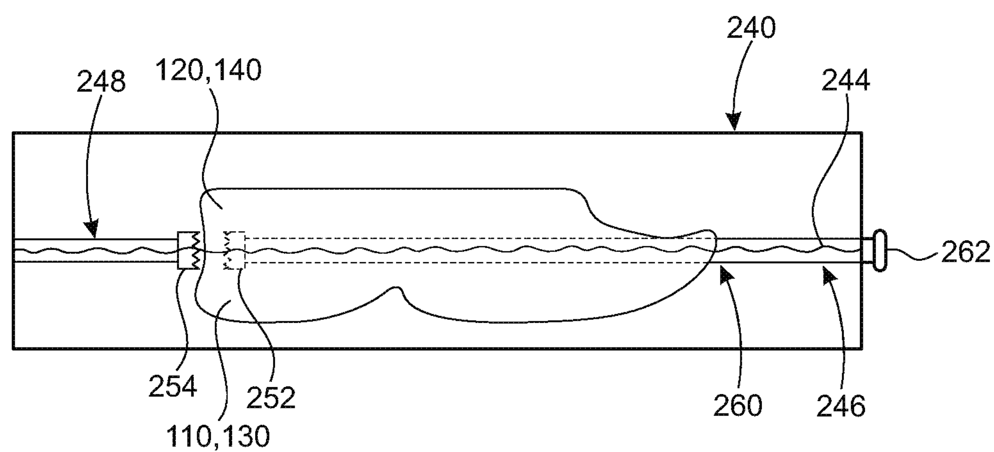
FIG. 9 is a side elevation view of the water bath vessel of FIG. 7 in conjunction with an impression tray of the impression system of FIG. 1 in accordance with the present disclosure.

Referring to FIG. 6, a method 200 of using the impression system 100. The method 200 may include (a) heating 202 one or more of the upper impression tray 110 or the lower impression tray 130 in a water bath vessel 240 (as illustrated in FIGS. 8-9). The method 200 may further include (b) inserting 204 the upper impression tray 110 and the lower impression tray 130 into a mouth 222 of the patient with the upper wax bite registration 120 facing the lower wax bite registration 140. The method 200 may further include (c) confirming 206 an occlusal vertical dimension OVD by either adding one or more arc-shaped wax plates 150 to one or more of the upper wax bite registration 120 or the lower wax bite registration 140, or reducing a height 122, 142 of one or more of the upper wax bite registration 120 or the lower wax bite registration 140, respectively. The height 122, 142 of one or more of the upper wax bite registration 120 or the lower wax bite registration 140, respectively, may be reduced using a metal occlusal plane adjuster, which may be heated.

A difference 210 between the rest vertical dimension RVD and the occlusal vertical dimension OVD may be between about 1 mm and about 4 mm. In some embodiments, the difference 210 may be less than 1 mm or greater than 4 mm.

In some embodiments, step (a) may be performed using a water bath vessel 240. In some embodiments, step (a) may be performed using a different heat source, such as, for example, infrared (IR), steam, microwave, induction, or the like.

Step (a) of the method 200 may further include border molding one or more of the upper impression tray 110 or the lower impression tray 130. In some embodiments, the upper impression tray 110 or the lower impression tray 130 may be border molded using an acrylic lab burr.

In some embodiments, step (a) of the method 200 may further include positioning one or more of the upper impression tray 110 or the lower impression tray 130 into heated water 244 of a water bath vessel 240 with the upper wax bite registration 120 or the lower wax bite registration 140 positioned above the heated water 244.

In some embodiments, step (a) of the method 200 may further include engaging one of the upper impression tray 110 or the lower impression tray 130 with a spring operated release mechanism 260 of the water bath vessel 240.

The water bath vessel 240 may be configured to warm the thermoplastic of the upper and lower impression trays 110, 130 to enable appropriate malleability border mold the tray with the patient's oral musculature dictating the peripheral borders of the tray.

The water bath vessel 240 may be include a receiving area 242 configured to receive water 244 and heat said water 244, for example, to about 160° F. The water bath vessel 240 may further include a first arm 246 and a second arm 248. Each of the first and second arms 246, 248 may include a non-slip head portion 252, 254 configured to engage one of the upper or lower impression trays 110, 130. The non-slip head portions 252, 254 may include dentate serrations. At least one of the first or second arms 246, 248 may include a spring operated release mechanism 260 configured to bias at least one of the non-slip head portions 252, 254 towards each other. The spring operated release mechanism 260 may include a release handle 262 which when engaged separates the at least one of the non-slip head portions 252, 254 from the other. The spring operated release mechanism 260 may secure one of the upper or lower impression trays 110, 130 between the non-slip head portions 252, 254 at a proper depth within the water 244 while preventing the associated upper or lower wax bite registration 120, 140 from contacting the warm water 244 and softening.

In some embodiments, step (a) of the method 200 may further include substantially maintaining a temperature of one or more of the upper wax bite registration or the lower wax bite registration, for example, using a thermal block (. In some embodiments, this may be accomplished by maintaining the upper wax bite registration or the lower wax bite registration outside of the water 244 while the upper impression tray 110 or the lower impression tray 130 is positioned in the water 244. In other embodiments, the method 200 may include cooling the upper wax bite registration or the lower wax bite registration prior to step (a) or contemporaneously with step (a). In some embodiments, the cooling may be accomplished by positioning the tray and wax bite registration in a refrigerator or freezer or a certain period of time. In some embodiments, the cooling may be accomplished by via an ice pack (or the like) while performing step (a).

In some embodiments, step (b) of the method 200 may further include receiving the concave inner surface 114 of the upper impression tray 110 over an upper gum arc of the patient 220. In some embodiments, step (b) of the method 200 may further include receiving a concave inner surface 134 of the lower impression tray 130 over a lower gum arc of the patient 220.

In some embodiments, step (b) of the method 200 may further include recording the anatomic landmarks of the patient 220 via impressions into the upper and lower impression trays 110, 130. The anatomic landmarks may include the ridge crest (e.g., alveolar ridge), palate, maxillary tuberosity, retromolar pads, vestibule, frenulum, incisive papilla, sublingual frenulum, hamular notch, gingival sulcus, midline, buccal shelf, or the like.

In some embodiments, the method 200 may further include creating an upper impression of an upper gum arc of the patient 220 by disposing impression material onto the concave inner surface 114 of the upper impression tray 110 followed by receiving the concave inner surface 114 of the upper impression tray 110 over the upper gum arc of the patient 220. In some embodiments, the method 200 may further include creating a lower impression of a lower gum arc of the patient 220 by disposing the impression material onto a concave inner surface 134 of the lower impression tray 130 followed by receiving the concave inner surface 134 of the lower impression tray 130 over the lower gum arc of the patient 220. The impression material may be polyvinyl siloxane or the like.

Figure 7:
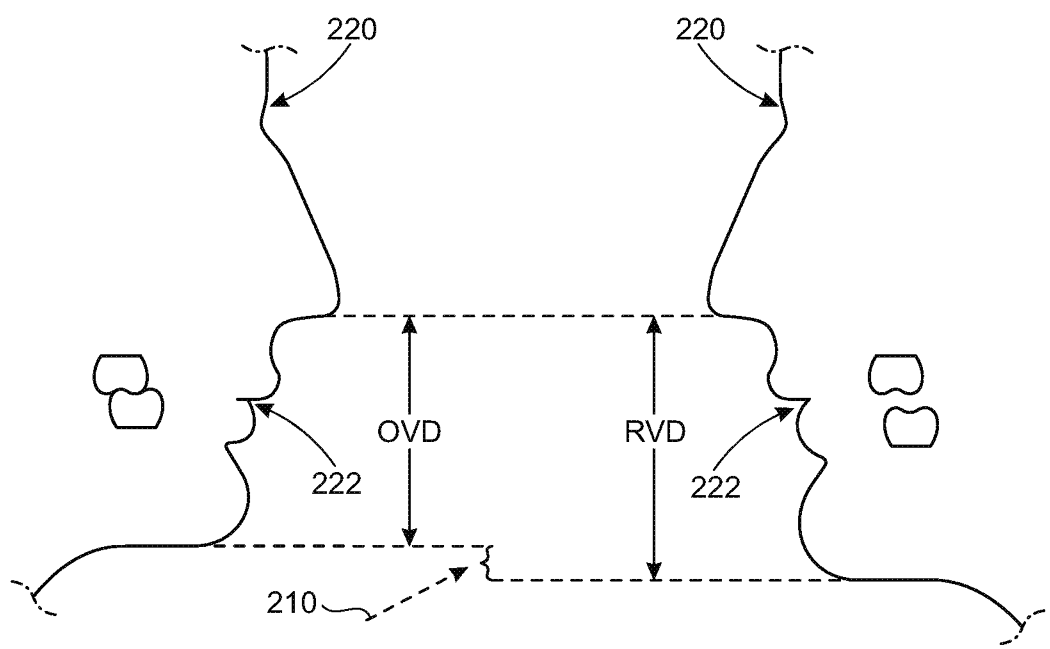
FIG. 7 is a side elevation view an embodiment of a patient in accordance with the present disclosure.

In some embodiments, the method 200 may further include measuring a rest vertical dimension RVD of a patient 220 (as illustrated in FIG. 7). In some embodiments, the method 200 may further include adjusting a height of one or more of the upper wax bite registration 120 or the lower wax bite registration 140 to ensure a difference between the rest vertical dimension RVD and the occlusal vertical dimension OVD is between about 1 mm and about 4 mm.

In some embodiments, the method 200 may further include scanning the upper and lower impressions. Once scanned, perfectly fitting dentures can be 3D printed or manufactured using a different method. Once scanned, the dentures may be three dimensionally modeled from the scan using a modeling software. For example, in some embodiments, the method 200 may include designing a denture drawing file from the scanned upper and lower impressions. In some embodiments, the method 200 may include printing the denture drawing file using a 3D printer to define printed denture portions. In some embodiments, the method 200 may further include assembling the printed denture portions and curing the assembled printed denture portions. In some embodiments, the method 200 may be completed in less than one day.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A method of using an impression system having an upper impression tray, an upper wax bite registration coupled to a convex outer surface of the upper impression tray, a lower impression tray, and a lower wax bite registration coupled to a convex outer surface of the lower impression tray, the method comprising:

(a) heating one or more of the upper impression tray or the lower impression tray by positioning one or more of the upper impression tray or the lower impression tray into heated water of a water bath vessel and engaging one of the upper impression tray or the lower impression tray with first and second arms of the water bath vessel such that upper wax bite registration or the lower wax bite registration is positioned above the heated water;

(b) inserting the upper impression tray and the lower impression tray into a mouth of a patient with the upper wax bite registration facing the lower wax bite registration; and (c) confirming an occlusal vertical dimension (OVD) by either adding one or more arc-shaped wax plates to one or more of the upper wax bite registration or the lower wax bite registration, or reducing a height of one or more of the upper wax bite registration or the lower wax bite registration using an occlusal plane adjuster.

2. The method of claim 1, wherein step (a) further comprises:

border molding one or more of the upper impression tray or the lower impression tray.

3. The method of claim 1, wherein step (a) further comprises:

engaging one of the upper impression tray or the lower impression tray with a spring release mechanism of the water bath vessel.

4. The method of claim 1, wherein step (c) further comprises:

heating the occlusal plane adjuster prior to reducing the height of one or more of the upper wax bite registration or the lower wax bite registration.

5. The method of claim 4, further comprising:

measuring a rest vertical dimension (RVD) of a patient; and adjusting a height of one or more of the upper wax bite registration or the lower wax bite registration to ensure a difference between the RVD and the OVD is between about 1 mm and about 4 mm.

6. The method of claim 1, wherein step (a) further comprises:

substantially maintaining a temperature of one or more of the upper wax bite registration or the lower wax bite registration.

7. The method of claim 1, wherein step (b) further comprises:

receiving a concave inner surface of the upper impression tray over an upper gum arc of the patient; and receiving a concave inner surface of the lower impression tray over a lower gum arc of the patient.

8. The method of claim 1, further comprising:

creating an upper impression of an upper gum arc of the patient by disposing impression material onto a concave inner surface of the upper impression tray followed by receiving the concave surface of the upper impression tray over the upper gum arc of the patient; and creating a lower impression of a lower gum arc of the patient by disposing the impression material onto a concave inner surface of the lower impression tray followed by receiving the concave surface of the lower impression tray over the lower gum arc of the patient.

9. The method of claim 8, further comprising:

scanning the upper and lower impressions using a scanning device.

10. A method of using an impression system having an upper impression tray, an upper wax bite registration coupled to a convex outer surface of the upper impression tray, a lower impression tray, and a lower wax bite registration coupled to a convex outer surface of the lower impression tray, the method comprising:

(a) heating one or more of the upper impression tray or the lower impression tray by positioning one or more of the upper impression tray or the lower impression tray into heated water of a water bath vessel and engaging one of the upper impression tray or the lower impression tray with non-slip head portions of first and second arms of the water bath vessel such that upper wax bite registration or the lower wax bite registration is positioned above the heated water;

(b) inserting the upper impression tray and the lower impression tray into a mouth of a patient with the upper wax bite registration facing the lower wax bite registration; and (c) confirming an occlusal vertical dimension (OVD) by either adding one or more arc-shaped wax plates to one or more of the upper wax bite registration or the lower wax bite registration, or reducing a height of one or more of the upper wax bite registration or the lower wax bite registration using an occlusal plane adjuster.

11. The method of claim 10, wherein step (a) further comprises:

border molding one or more of the upper impression tray or the lower impression tray.

12. The method of claim 10, wherein step (a) further comprises:

engaging one of the upper impression tray or the lower impression tray with a spring release mechanism of the water bath vessel.

13. The method of claim 10, wherein step (c) further comprises:

heating the occlusal plane adjuster prior to reducing the height of one or more of the upper wax bite registration or the lower wax bite registration.

14. The method of claim 13, further comprising:

measuring a rest vertical dimension (RVD) of a patient; and adjusting a height of one or more of the upper wax bite registration or the lower wax bite registration to ensure a difference between the RVD and the OVD is between about 1 mm and about 4 mm.

15. The method of claim 10, wherein step (a) further comprises:

substantially maintaining a temperature of one or more of the upper wax bite registration or the lower wax bite registration.

16. The method of claim 10, wherein step (b) further comprises:

receiving a concave inner surface of the upper impression tray over an upper gum arc of the patient; and receiving a concave inner surface of the lower impression tray over a lower gum arc of the patient.

17. The method of claim 10, further comprising:

creating an upper impression of an upper gum arc of the patient by disposing impression material onto a concave inner surface of the upper impression tray followed by receiving the concave surface of the upper impression tray over the upper gum arc of the patient; and creating a lower impression of a lower gum arc of the patient by disposing the impression material onto a concave inner surface of the lower impression tray followed by receiving the concave surface of the lower impression tray over the lower gum arc of the patient.

18. The method of claim 10, further comprising:

scanning the upper and lower impressions using a scanning device.

* * * * *